June 19, 1951     J. A. BENNER     2,557,169
CONTAINER CLOSURE ADHESIVE COMPRISING AN AQUEOUS DISPERSION OF
ALBUMIN AND AN ISOBUTYLENE-DIOLEFIN COPOLYMER
Filed March 18, 1948
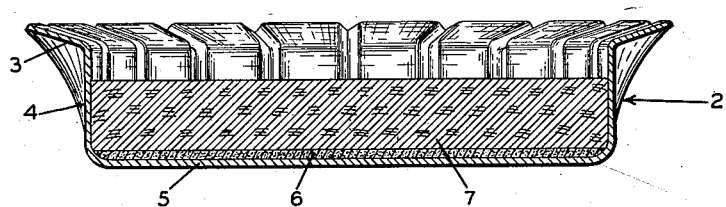
Inventor
JOSEPH A. BENNER
Attorney Patented June 19, 1951

2,557,169

UNITED STATES PATENT OFFICE 2,557,169

CONTAINER CLOSURE ADHESIVE COMPRISING AN AQUEOUS DISPERSION OF ALBUMIN AND AN ISOBUTYLENE-DIOLEFIN COPOLYMER

Joseph A. Benner, Lancaster, Pa., assignor to Armstrong Cork Company, Lancaster, Pa., a corporation of Pennsylvania Application March 18, 1948, Serial No. 15,612

4 Claims. (Cl. 260—8)

The invention relates to closure manufacture and is concerned more particularly with the manufacture of container closures in which the metal shell has adhesively joined thereto a resilient sealing liner such as a disc of cork composition.

In the manufacture of metal closures, particularly the so-called "crowns," tin plate, black plate, or bonderized black plate are commonly used as the base metal, and a decoration is generally applied to one side thereof by lithographing. The other surface is commonly provided with a protective coating which may be of lacquer, resin, oleoresinous materials or the like. The metal sheet is fed to a multiple head press where crown shells are punched and formed. The shells are fed to any assembly machine where an adhesive is applied to the inner head surface of the shell, and a crown liner of cork composition or the like is pressed thereagainst. Heat is applied, generally by means of gas flames, to the outer head surface of the metal shell through a conducting metal plate to set the adhesive which is activatable by heat.

Closure assembly must be effected very rapidly in order to be economically practicable, and care must be exercised to prevent any deleterious action upon the decoration. Thus the adhesive which is employed must be fast-acting and must be activatable at a relatively low temperature, for otherwise the decoration will be damaged by the heat employed in activation of the adhesive or the process will be too slow to be commercially attractive.

An object of the invention is to provide a method of assembling crown or similar metal closure shells with sealing liners with a heat activatable adhesive capable of being activated within the temperature range between 200° F. and 300° F., such activation being substantially instantaneous at temperatures approaching 300° F.

A further object of my invention is to provide a bottle closure including a metal shell and a resilient sealing liner adhesively joined to the shell by a heat activatable mixture activated at a temperature between 200° and 300° F. whereby the decoration on the closure is not deleteriously affected by the heat applied in activation of the adhesive.

A further object of my invention is to provide an adhesive for joining a sealing liner to a metal closure shell by the application of heat thereto between 200° and 300° F., the adhesive acting to form its bond upon attaining such elevated temperature.

In order that the invention may be clearly understood, I shall describe the same in conjunction with the attached drawing which is a sectional view of the new crown type closure having a sealing liner adhesively joined thereto with my new adhesive by my new method.

In the manufacture of crown type closures, the following factors must be considered, and, if a high quality closure is to be economically produced, the requirements should be met. Any failure to meet the requirements will result in a compromise with top quality and economical manufacture.

1. The adhesive should be capable of setting rapidly with a mild degree of heat.
2. The adhesive should not tend to rust the metal plate, partcularly black plate when it is employed.
3. There should be no substantial tendency for the adhesive to pull off the lacquer applied to the inner surface of the shell.
4. The adhesive film in its activated condition should possess flexibility and should not become brittle on aging.
5. The adhesive should not transmit an objectionable taste or odor to the product sealed by the closure.
6. The adhesive should have good affinity for the lacquer coating on the metal and should be effective to "wet" the lacquer properly to attain a strong bond.
7. The adhesive should be activatable over a fairly wide temperature range in the order of 100° F. and should be activatable below 300° F., preferably in the range between 230° F. and 260° F.
8. Where waxed sealing discs are used, the adhesive should be capable of properly "wetting" the disc and forming a strong bond therewith.
9. The adhesive should preferably be stable over relatively long periods of time without substantial change in viscosity.

The following adhesive composition possesses the above enumerated characteristics:

Example I

| | Pounds |
|---|---|
| Dry egg albumin | 44 |
| Water | 38 |

The egg albumin solution is prepared by mixing the water and the dry egg albumin and allowing the mixture to soak for at least 12 hours. After soaking, the mixture is thoroughly stirred with a mechanical mixer until all of the egg albumin has been dissolved in the water. The solution thus formed is passed through a fine mesh screen to separate solid foreign material therefrom.

A copolymer of isobutylene and one or more conjugated noncylic diolefins containing from 4 to 10 carbon atoms, such as isoprene or butadiene or both are polymerized at −10° C. to −165° C. under the influence of an ionic type catalyst, such as boron trifluoride or the anhydrous halide of amphoteric elements. The resulting product is hydrolyzed and substantially freed of inorganic compounds, dried, and suitably dispersed in an aqueous medium. By way of illustration, the following example is given:

| | Pounds |
|---|---|
| Isobutylene | 98 |
| Isoprene | 2 |

The mixture is copolymerized at reduced temperature in the presence of boron trifluoride, hydrolyzed, freed of inorganic compounds, dried, and dispersed in water to form a dispersion having 67% solids.

About 35 pounds wet weight of the copolymer dispersion so formed are mixed with the 82 pounds of egg albumin solution prepared in accordance with this example to produce a mixture which will have a solids content of about 58%.

The mixture should have a viscosity in the neighborhood of 3 and 6.5 poises, and may be adjusted by adding water where the viscosity exceeds the desired range or may be increased in viscosity by the addition of a viscosity builder such as carboxymethylcellulose or sodium silicate.

It has been found that the egg albumin solution is compatible with the copolymer dispersion and may be satisfactorily mixed with the high concentration copolymer dispersion without "breaking." This is important in the preparation of a crown adhesive and makes possible the attainment of exceptionally high activation rates—they may be termed substantially instantaneous—at relatively moderate temperatures, thus making possible high speed assembly without damage to the closure decoration. The solids content of the adhesive mixture should in all instances be above 40% and should be as much in excess thereof as possible, consistent with good application to the closure shell. At higher temperatures of activation, close to the 300° F. top limit, a lower percentage of solids can be tolerated than at the opposite end of the activation temperature range, near the 200° F., where the solids concentration should be at least 50% if high speed assembly is to be achieved.

Another example of a suitable composition is the following:

*Example II*

| | | |
|---|---|---|
| Dried blood albumin | lb | 20 |
| Water | lb | 33 |
| Tributyl phosphate | fluid oz | 3⅓ |

The albumin solution is prepared as in Example I. A similar solution is also prepared by the same procedure:

| | Pounds |
|---|---|
| Dry egg albumin | 15 |
| Water | 10 |

A copolymer dispersion is prepared as follows:

| | Pounds |
|---|---|
| Isobutylene | 95 |
| Butadiene 1,3 | 5 |

The copolymerization and dispersion are effected in the same manner as in Example I.

The solutions of egg and blood albumin are blended together and 34 pounds wet weight of the above copolymer dispersion are mixed therewith in the same way as in Example I.

The adhesive thus prepared will have a solids content of about 51% and the viscosity should be within the range of 3 and 6.5 poises. Viscosity adjustment may be accomplished in the same manner as in Example I.

Egg albumin is more costly than blood albumin, and, for that reason, where cost is an important factor, the mixture of blood and egg albumin solutions given in Example II is preferably employed. The ratio of blood albumin to egg albumin may vary from a mixture consisting essentially wholly of blood albumin to one consisting entirely of egg albumin as in Example I. The proportioning may be varied and depends almost entirely upon cost and the temperature and time for activation. Generally, the higher the quantity of blood albumin, the longer the activation time. For that reason, it is desirable to use a substantial portion of egg albumin in order that the activation rate may be high, preferably substantially instantaneous at temperatures in the order of 260° to 300° F. In addition, egg albumin provides a somewhat better bond, but the difference is generally not sufficient to warrant the increased cost of a straight egg albumin solution, although one may be used as mentioned above.

It is preferred to use a mixture of about 70 parts of albumin solution wet weight and 30 parts of copolymer dispersion wet weight, but the proportions may be varied within the limits of 65 to 90% of albumin solution and 35 to 10% of the copolymer dispersion.

While I prefer to use a copolymer consisting essentially of 95 to 98% of isobutylene and 5 to 2% of isoprene, comparable results may be accomplished by forming the copolymer of 95 to 98% of isobutylene and 5 to 2% butadiene 1,3, or by forming a polymerization product of a mixture of 95 to 98% of isobutylene and 5 to 2% of a mixture of isoprene and butadiene 1,3. Other conjugated noncyclic diolefins containing from 4 to 10 carbon atoms may be substituted in whole or in part. The copolymer dispersion preferably has a minimum solids content of 60% and, as indicated in the specific example, a higher concentration is preferred.

In the manufacture of metal closures according to my invention, the preferred practice is to deposit the adhesive into the head of the closure as a thin film. The sealing liner is then pressed into engagement with the film of adhesive within the shell and the assemblage under pressure is heated to activation temperature. This heating may be accomplished in any of the machines commonly used by the industry in which the closure shell with the liner therein and with the adhesive disposed therebetween is disposed in a rotary drum with individual plungers applying pressure to the individual assemblies. A series of gas flames are played upon the support for the shells and thus heat the support, and the heat is conducted through the metal shells to the adhesive. In such machines, heating is accomplished in the order of 5 to 6 seconds, and with my adhesive it has been found that a permanent bond is formed during such interval. Just as soon as the adhesive has set, the completed closure may be removed from the machine.

In the drawing which illustrates the closure of this invention, the numeral 2 has been applied to indicate the closure generally. It is provided with a flaring skirt 3, a substantially cylindrical body 4, and a head or top portion 5. The top portion 5 and generally the body 4 and skirt 3 are provided with a lithographic decoration. The inner surface of the shell is generally provided with a film of lacquer or other protective coating material. The film of adhesive is indicated at 6, and the sealing liner which has been illustrated as a disc of cork composition 7 is firmly secured to the shell by the adhesive 6.

Employing my method with the adhesive disclosed in Examples I and II, I have found it possible to assemble crowns at rates as high as 900 crowns per minute with activation temperatures in the neighborhood of 230° F. The actual time of contact between the heated metal surface and the crown shell, adhesive, and liner assemblage was in the order of 5 to 6 seconds; but, considering the time for the conduction of heat through the decoration and the metal shell prior to reaching the adhesive, not more than 2 to 2½ seconds of actual heating of the adhesive was effected.

While I have illustrated and described certain preferred embodiments of my invention, it will be understood the same is not limited thereto but may be otherwise embodied and practiced within the scope of the following claims.

I claim:

1. An adhesive for joining a sealing liner to a metal closure shell by the application of heat thereto between 200° F. and 300° F. comprising a compatible mixture of: (a) 10 to 35% of a water dispersion of a copolymer consisting essentially of 95 to 98% isobutylene and 5 to 2% of conjugated noncyclic diolefin containing from 4 to 10 carbon atoms, said copolymer dispersion having at least 60% solids, and (b) 90% to 65% of a compatible aqueous solution of albumin of such solids content that said mixture will possess a solids content of at least 40%, said adhesive being characterized by its rapid and substantially complete activation at temperatures between 200° and 300° F. to form an effective bond.

2. An adhesive for joining a sealing liner to a metal closure shell having a lithographic decoration on the outer surface thereof comprising a mixture of: (a) 10 to 35% of a water dispersion of a copolymer consisting essentially of 95 to 98% isobutylene and 5 to 2% of conjugated noncyclic diolefin containing from 4 to 10 carbon atoms, having at least 60% solids, and (b) 90 to 65% of an aqueous solution of albumin, including egg albumin, said mixture having a solid content of at least 40%, and said adhesive being characterized by its rapid and complete activation at temperatures between 200° F. and 300° F. at which temperature said lithographic decoration is substantially unaffected.

3. An adhesive for joining a sealing liner to a metal closure shell comprising an adhesive mixture of a water dispersion of a copolymer consisting essentially of 98 parts isobutylene and 2 parts isoprene, said copolymer representing about 67% by weight of the dispersion, and an aqueous solution of egg albumin containing at least 50% solids by weight, said mixture including 35 parts by wet weight of the copolymer dispersion and 82 parts by wet weight of the egg albumin solution and having a solids content of about 58%, said adhesive being characterized by its rapid and complete activation at temperatures between 200° F. and 300° F.

4. An adhesive for joining a sealing liner to a metal closure shell comprising an adhesive mixture of a water dispersion of a copolymer consisting essentially of 95 parts isobutylene and 5 parts butadiene 1,3, said copolymer representing about 67% by weight of the dispersion, and a mixture of 20 parts by weight blood albumin and 15 parts by weight egg albumin in water solution having about 45% solids, said mixture including about 34 parts by weight of said copolymer dispersion and 78 parts by weight of said albumin solution and having a solids content of about 51%, said adhesive being characterized by its rapid and complete activation at temperatures between 200° F. and 300° F.

JOSEPH A. BENNER.

REFERENCES CITED

The following references are of record in the file of this patent:

UNITED STATES PATENTS

| Number | Name | Date |
|---|---|---|
| 1,740,184 | Levin | Dec. 17, 1929 |
| 1,852,532 | Levin | Apr. 5, 1932 |
| 2,065,941 | Lane | Dec. 29, 1936 |
| 2,097,212 | Healy | Oct. 26, 1937 |
| 2,340,358 | Young | Feb. 1, 1944 |
| 2,419,304 | Warth et al. | Apr. 22, 1947 |
| 2,458,222 | Talalay | Jan. 4, 1949 |
| 2,476,430 | Robbins | July 19, 1949 |

FOREIGN PATENTS

| Number | Country | Date |
|---|---|---|
| 122,284 | Australia | Jan. 16, 1941 |